(12) United States Patent
Hong et al.

(10) Patent No.: US 8,034,479 B2
(45) Date of Patent: Oct. 11, 2011

(54) BATTERY PACK

(75) Inventors: Jin-Tae Hong, Suwon-si (KR); Woon-Seong Baek, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 55 days.

(21) Appl. No.: 12/108,753

(22) Filed: Apr. 24, 2008

(65) Prior Publication Data

US 2008/0292913 A1  Nov. 27, 2008

(30) Foreign Application Priority Data

May 21, 2007  (KR) .................. 10-2007-0049248

(51) Int. Cl.
*H01M 2/08* (2006.01)
*H01M 2/04* (2006.01)
*H01M 2/02* (2006.01)

(52) U.S. Cl. .................. 429/175; 429/176; 429/177

(58) Field of Classification Search ............... 429/7, 61, 429/163, 164, 174, 175, 176, 177
See application file for complete search history.

(56) References Cited

U.S. PATENT DOCUMENTS

| | | | | |
|---|---|---|---|---|
| 5,432,027 A | * | 7/1995 | Tuttle et al. | 429/127 |
| 5,464,705 A | * | 11/1995 | Wainwright | 429/61 |
| 6,242,130 B1 | | 6/2001 | Noh et al. | |
| 6,451,476 B1 | | 9/2002 | Chang et al. | |
| 2004/0121226 A1 | * | 6/2004 | Kaelin et al. | 429/96 |
| 2006/0127756 A1 | * | 6/2006 | Seo | 429/175 |

FOREIGN PATENT DOCUMENTS

| | | |
|---|---|---|
| JP | 9-97598 | 4/1997 |
| JP | 9-213284 | 8/1997 |
| JP | 11-283589 | 10/1999 |
| JP | 2003-257389 | 9/2003 |
| JP | 2004-214143 | 7/2004 |
| JP | 2004-327340 | 11/2004 |
| JP | 2005-339811 | 12/2005 |
| KR | 10-426372 | 3/2004 |
| KR | 2006-59699 | 6/2006 |
| KR | 2006-84888 | 7/2006 |
| KR | 2007-27351 | 3/2007 |

OTHER PUBLICATIONS

Notice of Allowance issued by the Korean Patent and Trademark Office in Korean Application No. 2007-49248 on Nov. 12, 2008.
English Abstract for Korean Patent No. 2003-76001.
Office Action issued in corresponding Korean Patent Application No. 10-2007-0049248 dated May 27, 2008.

* cited by examiner

*Primary Examiner* — Jennifer K. Michener
*Assistant Examiner* — Eli Mekhlin
(74) *Attorney, Agent, or Firm* — Knobbe Martens Olson & Bear LLP

(57) ABSTRACT

A battery case including: first case body having a main wall and opposing side walls; a second case body including a second main wall and opposing side walls. The first and second side walls include coupling parts to be coupled together when the first and second case bodies are pressed together to form a space to receive a bare cell. The battery case can also include clips to couple the first and second side walls.

6 Claims, 8 Drawing Sheets

BATTERY PACK

CROSS-REFERENCE TO RELATED APPLICATION

This application claims the benefit of Korean Application No. 2007-49248, filed May 21, 2007 in the Korean Intellectual Property Office, the disclosure of which is incorporated herein by reference.

BACKGROUND OF THE INVENTION

1. Field of the Invention

Aspects of the present invention relate to a battery pack, and more particularly, to a battery pack in which a coupling part of a case that is formed to enclose a bare cell is closely contacted to prevent a molding being inferior due to a molding material leaking from the coupling part of the case during the molding using resin or hot melt.

2. Description of the Related Art

Recently, compact and portable electronic/electric appliances, such as, cellular phones, lap-top computers, camcorders, and so on, have been actively developed and produced, and require battery packs for portable operations. In consideration of economical concerns, a battery pack generally includes a secondary battery that is rechargeable, such as, a nickel-cadmium (Ni—Cd) battery, a nickel-hydrogen (Ni-MH) battery, and a lithium (Li) battery.

Battery packs including an Li secondary battery are widely used for the portable electronic/electric appliances. The Li secondary battery is used because an Li secondary battery has an operating voltage three times larger than that of the Ni—Cd battery or the Ni-MH battery, and an energy density per unit weight larger than that of the Ni—Cd battery or the Ni-MH battery. An Li secondary battery may be classified as an Li ion battery using a liquid electrolyte, and a Li polymer battery using polymer electrolyte, according to the type of electrolyte used. The Li secondary battery can also be classified according to shape, for example, as a cylindrical Li battery, a rectangular Li battery, and a pouch-type Li battery.

A battery pack using an Li secondary battery includes a bare cell and a protecting circuit board electrically connected to the bare cell, to prevent the bare cell from being excessively discharged and overcharged. In order to attach the bare cell and the protecting circuit board, a molding process is usually performed. The molding process fills a space formed between the bare cell and the protecting circuit board using molding material such as, a resin, a hot melt, and so on. Here, the bare cell is fabricated such that in an electrode assembly, including a positive electrode plate and a negative electrode plate, electrode taps are connected to electrode collectors, which are coated with an electrode active material, and a separator disposed between the positive electrode plate and the negative electrode plate. The bare cell is disposed in an open-topped can. The opened top of the can is sealed by a cap assembly.

When strength of the battery pack is reinforced to protect the bare cell from exterior impacts by enclosing the outer side of the bare cell, the case is physically coupled to improve the reliability of the bare cell. However, the case is not completely coupled at coupling parts, so that the molding material leaks from the coupling parts and causes an inferiority molding of the battery pack.

SUMMARY OF THE INVENTION

Aspects of the present invention are directed to a battery case of a battery pack, in which side walls of the case interlock with each other, in order to improve molding of the battery pack.

Aspects of the present invention provide a battery case for a battery pack. The battery pack can comprise: a bare cell; a protecting circuit board electrically connected to the bare cell; and a case to enclose the bare cell and including coupling parts.

Aspects of the present invention provide a battery case can comprise first side walls, second side walls, and tabs extending from the first side walls. The tabs are folded over the second side walls to couple the first and second side walls.

Aspects of the present invention provide a battery case including clips to couple first and second side walls of the case.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
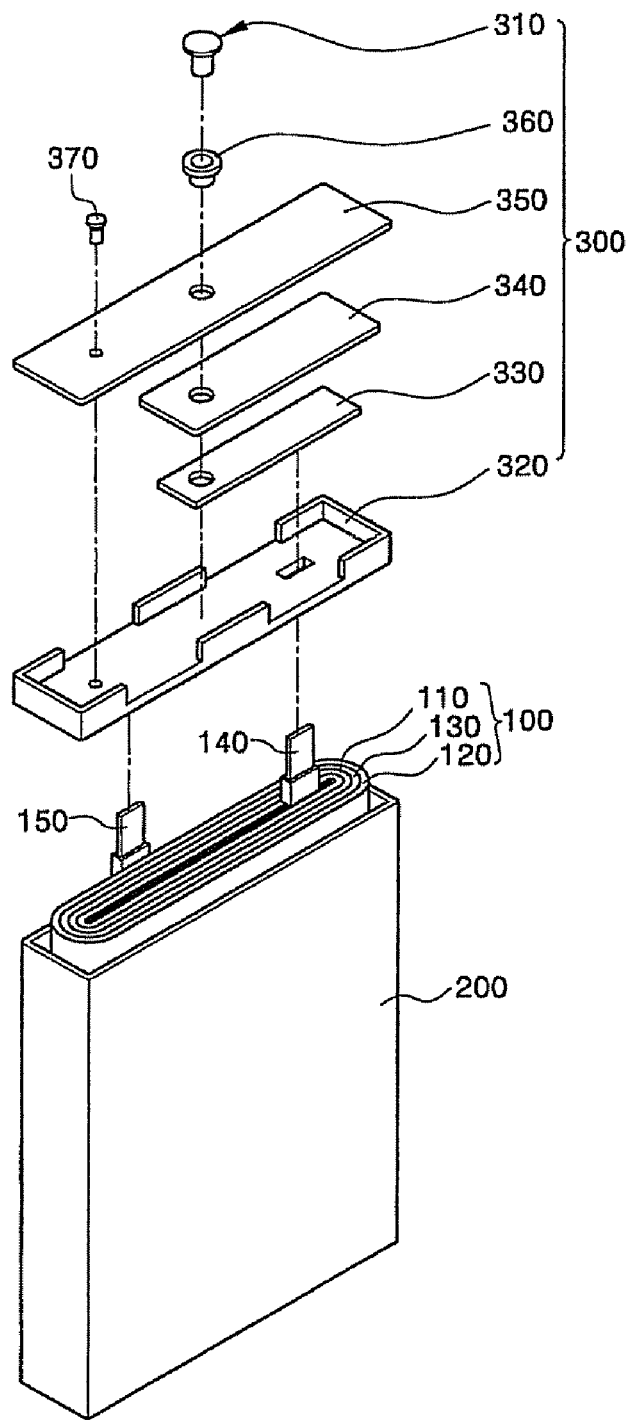
FIG. 1 is an exploded perspective view illustrating a bare cell, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below in order to explain the aspects of the present invention by referring to the figures. When some part is described as being "connected to" other part, this refers to a "direct connection" and an "electrical indirect connection" including component(s) therebetween.

FIG. 1 is an exploded perspective view illustrating a bare cell 101, according to an exemplary embodiment of the present invention. Referring to FIG. 1, the bare cell 101 includes an electrode assembly 100, a can 200 having an opened upper end, to accommodate an electrolyte (not shown), so that Li ions can move within the electrode assembly 100, and a cap assembly 300 to seal the can 200. The electrode assembly 100 includes a positive electrode plate 120 having a positive electrode tap 150, which is electrically connected to a positive electrode collector (not shown) coated with positive electrode active material (not shown), a negative electrode plate 110 having a negative electrode tap 140 which is electrically connected to a negative electrode collector (not shown) coated with negative electrode active material (not shown), and a separator 130 disposed between the positive electrode plate 120 and the negative electrode plate 110.

The positive electrode active material may include Li-containing transition metal oxides or Li chalcogenide compounds. For example, the active material can be $LiCoO_2$, $LiNiO_2$, $LiMnO_2$, $LiMn_2O_4$, or $LiNi_{1-x-y}Co_xM_yO_2$ (wherein $0 \leq x \leq 1$, $0 \leq y \leq 1$, $0 \leq x+y \leq 1$, and M is a metal such as Al, Sr, Mg, La, and so on). The negative electrode active material may include carbon materials, such as, crystalline carbon, amorphous carbon, a carbon complex, carbon fiber, and so on, a lithium metal, or a lithium alloy.

The positive electrode collector or the negative electrode collector may be formed of a material that is selected from a group consisting of a stainless steel, nickel, copper, aluminum, and alloys thereof. Preferably, the positive electrode collector may be formed of the aluminum or an aluminum alloy, and the negative electrode collector may be formed of the copper or a copper alloy, thereby maximizing efficiency. However, the collectors are not so limited.

The separator 130 is disposed between the positive electrode plate 120 and the negative electrode plate 110 so as to prevent electrical short circuit and to enable movement of a Li ion. The separator 130 may be formed of a polyolefin-based polymer layer such as polyethylene (PE) and polypropylene (PP), or a multi-layer thereof.

The can 200, as illustrated in the drawing, may be formed of a rectangular shape, and may be alternately formed of cylindrical or pouch shape. The can 200 may be fabricated from a metal material. Preferably, the can 200 may be fabricated from a light-weight and flexible metal material, such as, aluminum, an aluminum alloy, a stainless steel, or the like, which allows the can 200 to function as a terminal. The can 200 forms an interior cavity to hold the electrode assembly 100. As shown, the can 200 is a solid shape that does not deform during manufacture. However, aspects can use pouch-type containers that deform due to their having soft sides.

The cap assembly 300 is coupled to the upper opening of the can 200 and includes a cap plate 350, an insulation plate 340, a terminal plate 330, an insulation case 320, and an electrode terminal 310. The cap plate 350 is a metal plate having a size and a shape corresponding to the upper opening of the can 200. The cap plate 350 includes a terminal hole of a predetermined size, an electrolyte injection hole, and a safety vent (not shown). The safety vent may be formed at any region where it does not interfere with the terminal hole and the electrolyte injection hole.

The electrode terminal 310 is inserted into the terminal hole and is connected to the terminal plate 330. In this case, in order to insulate the cap plate 350 from the electrode terminal 310, a gasket 360, formed of an insulating rubber or a non-conductive material, is disposed to insulate the electrode terminal 310.

The electrolyte, if a liquid electrolyte, is injected through electrolyte injection hole into the can 200, in which the electrode assembly 100 is accommodated, so as to smoothly move Li ions during the discharge or the recharge of the bare cell 101. The electrolyte is injected through the electrolyte injection hole, after sealing the can 200 using the cap assembly 300, and the electrolyte injection hole is sealed by an electrolyte injection hole stopper 370, so as to seal the can 200. However, it is understood that, if a solid electrolyte is used, no electrolyte injection hole need be used, and the electrolyte can be used in addition to or instead of the separator 130.

The insulation plate 340 and the terminal plate 330 are sequentially disposed under the cap plate 350. The terminal plate 330 is electrically connected to the electrode terminal 310 and the negative electrode tap 140, so that the electrode terminal 310 is electrically connected to the negative electrode tap 140. The insulation plate 340 is disposed between the cap plate 350 and the terminal plate 330, to insulate the cap plate 350 from the terminal plate 330.

The insulation case 320 may be formed of an insulating polymer resin, such as, polypropylene (PP), polyphenylene sulfide (PPS), polyethersulfone (PES), modified polyphenylene oxide (PPO), or the like. The insulation case 320 is disposed on the upper opening of the can 200, to cover the upper side of the electrode assembly 100 and to fix the positive electrode tap 150 and the negative electrode tap 140 of the electrode assembly 100. The insulation case 320 may include a support frame formed in the periphery of thereof, to safely position the terminal plate 330 and the insulation plate 340.

Although not depicted, the bare cell 101, including the electrode assembly 100, the can 200, and the cap plate 300, is connected to the protecting circuit board (not shown), such that a discharge and the recharge of the bare cell is controlled. The protecting circuit board is configured such that a plurality of electric components are mounted on a printed circuit board (PCB), in which interconnection patterns are formed, and is electrically connected to the bare cell 101, via a lead plate. Here, a secondary protecting device, such as, a positive temperature coefficient (PTC), a thermal fuse, a bimetal, or a thermal braker, may be disposed between and be electrically connected to the bare cell 101 and the protecting circuit board, to control the current in the bare cell according to an ambient temperature.

Figure 2A:
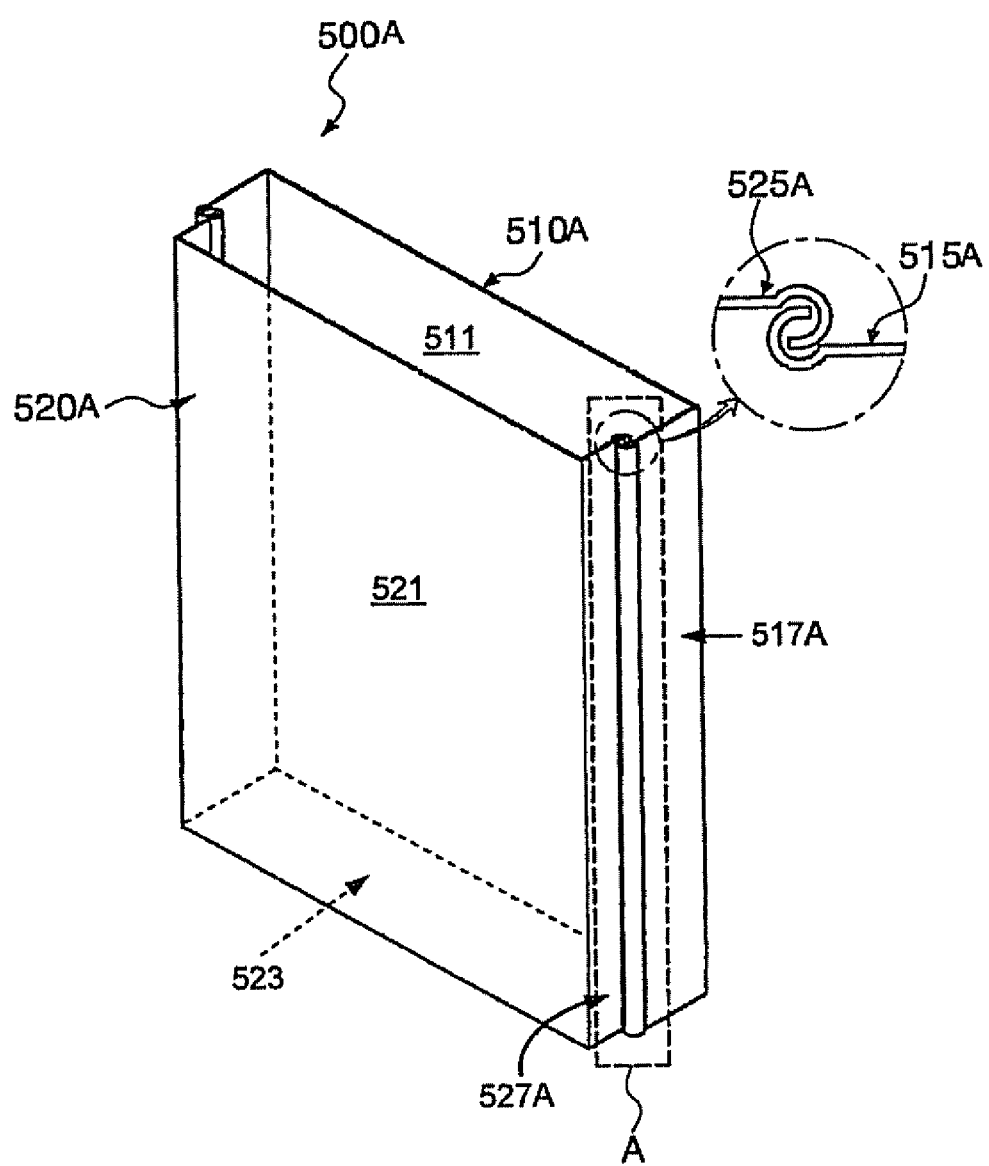
FIGS. 2A to 2C are perspective views illustrating cases of battery packs, according to exemplary embodiments of the present invention.
Figure 2B:
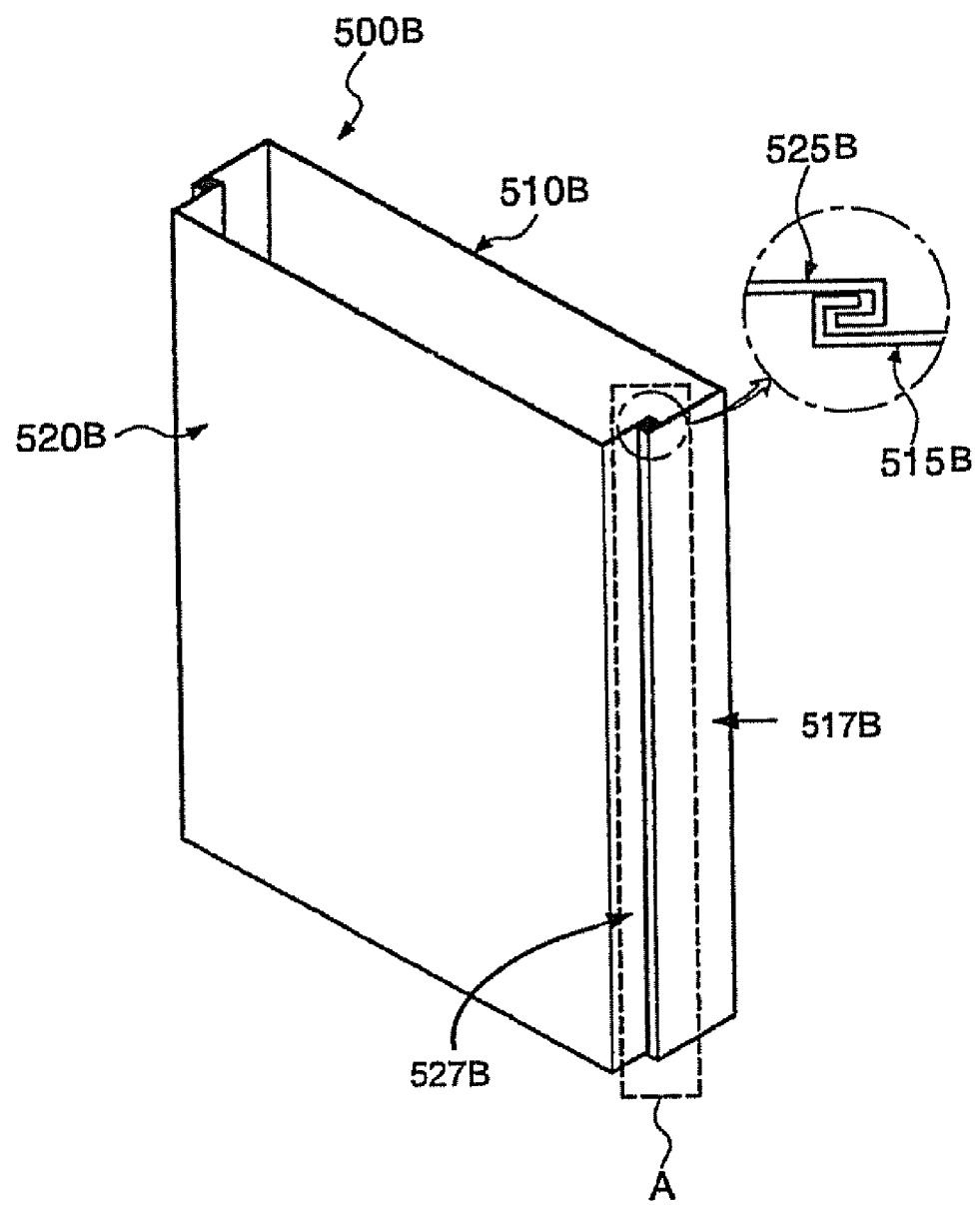
Figure 2C:
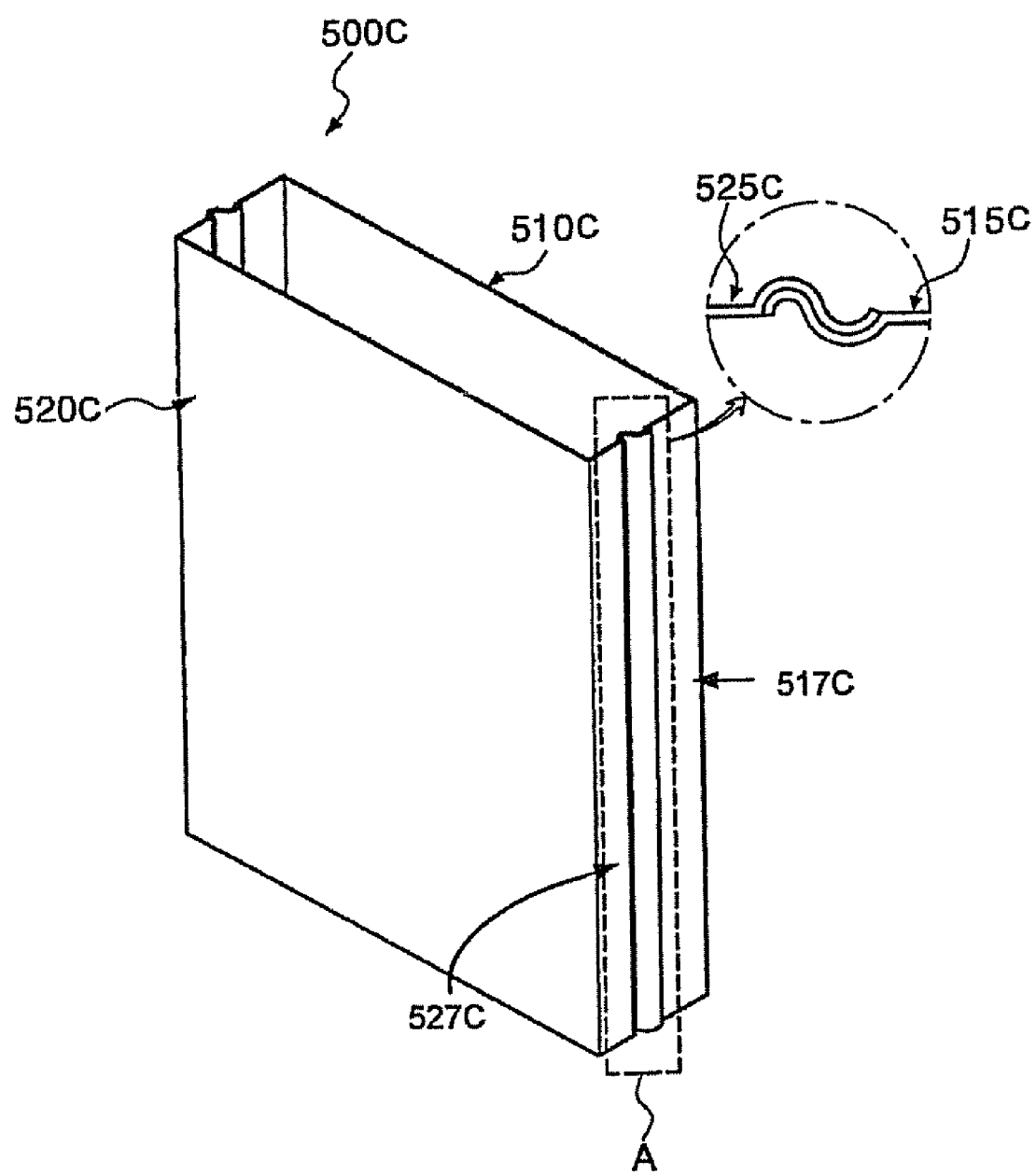

FIGS. 2A to 2C are perspective views illustrating battery cases 500A-500C, of a battery pack, according to exemplary embodiments of the present invention. Referring to FIG. 2A, the case 500A is to house the bare cell 101, and thereby form a battery pack. The case 500A includes a first case body 510A, including first side walls 517A, which include first coupling parts 515A; and a second case body 520A, including second side walls 527A, which include second coupling parts 525A. The case 500A also includes first and second main walls 511 and 521, disposed between the first and second side walls 517A and 527A, and a bottom wall 523 disposed between the first and second case bodies 510A and 520A. The case 500A may be formed of material that is strong enough to reinforce the strength of the battery pack. The case 500A may be formed of a stainless steel, such as a steel use stainless (SUS), in order to ensure a light weight battery pack and/or for ease of manufacture.

The first case body 510A and the second case body 520A contact longitudinal sides of the bare cell 101, when the bare cell 101 is inserted therein. The first and second coupling parts 515A and 525A are joined together, at coupling regions A of the case 500A. The coupling regions A are positioned adjacent to narrow sides of the bare cell 101. The first and second case bodies 510A and 520A are each bent toward one another, to join the first and second coupling parts 515A and 525A, such that a molding material (such as a resin or hot melt) injected into the case 500A cannot pass between the first and second coupling parts 515A and 525A. The first and second coupling parts 515A and 525A are shown to be bent into interlocking semi-circular shapes. The first and second coupling parts 515A and 525A, and/or the first and second side walls 517A and 527A, can be elastically deformed during the coupling, but generally return to their originally shape after the coupling is completed, to maintain an interlocking relationship.

FIG. 2B illustrates a case 500B to house the bare cell 101. The case 500B includes a first case body 510B, including first side walls 517B, which include first coupling parts 515B; and a second case body 520B, including second side walls 527B, which include second coupling parts 525B. The case 500B is similar to the case 500A, except for the shapes of the first and second coupling parts 515B and 525B. The first and second coupling parts 515B and 525B are shown to be bent into corresponding semi-rectangular shapes. The shapes of the first and second coupling parts 510B and 525B prevent a molding material (such as resin or hot melt), injected into the case 500B, from passing between the first and second coupling parts 515B and 525B and exiting the case 500B. The first and second coupling parts 515B and 525B, and/or the first and second side walls 517B and 527B, can be elastically deformed during the coupling, but generally return to their originally shape after the coupling is completed, to maintain an interlocking relationship.

FIG. 2C illustrates a case 500C to house the bare cell 101. The case 500C includes a first case body 510C including first side walls 517C, which include first coupling parts 515C; and a second case body 520C including second side walls 527C, which include second coupling parts 525C. The case 500C is similar to the case 500A, except for the shapes of the first and second coupling parts 515C and 525C. The first and second coupling parts 515C and 525C are shown to be bent into corresponding sinusoidal or wave shapes. The shapes of the first and second coupling parts 510C and 525C prevent a molding material (such as resin or hot melt), injected into the case 500C, from passing between the first and second coupling parts 510C and 515C and exiting the case 500C. The first and second coupling parts 515C and 525C, and/or the first and second side walls 517C and 527C, can be elastically deformed during the coupling, but generally return to their originally shape after the coupling is completed to maintain an interlocking relationship.

The first and second coupling parts 515A-C and 525A-C can be bent into any number of shapes, or other interlocking protrusions and depressions, so long as a molding or resin material is prevented from exiting the respective cases 500A-C therethrough. Further, the parts 515A-C and 515A-C can be corrugated, in that they have multiple interlocking grooves and ridges. The second coupling parts 525A-C can contact the bare cell 101, or may be spaced apart from the bare cell 101.

According to various embodiments, the first and second coupling parts 515A-C and 525A-C may be positioned at the longitudinal sides of the bare cell 101 (rather than the narrow sides). In other exemplary embodiments, the cases 500A-C may be formed as an integrated body.

Figure 3A:
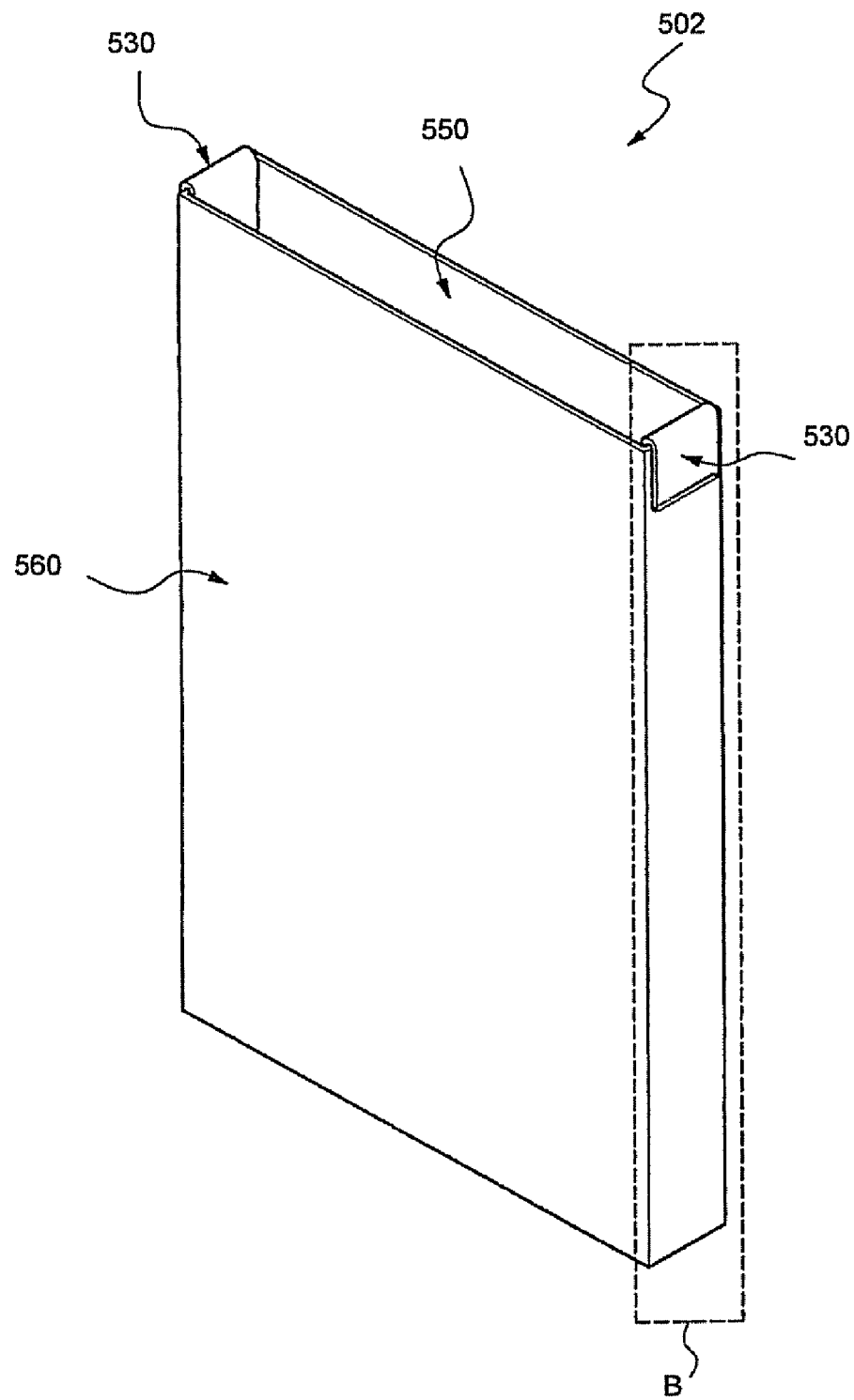
FIG. 3A is a perspective view illustrating a case of a battery pack, according to an exemplary embodiment of the present invention.
Figure 3B:
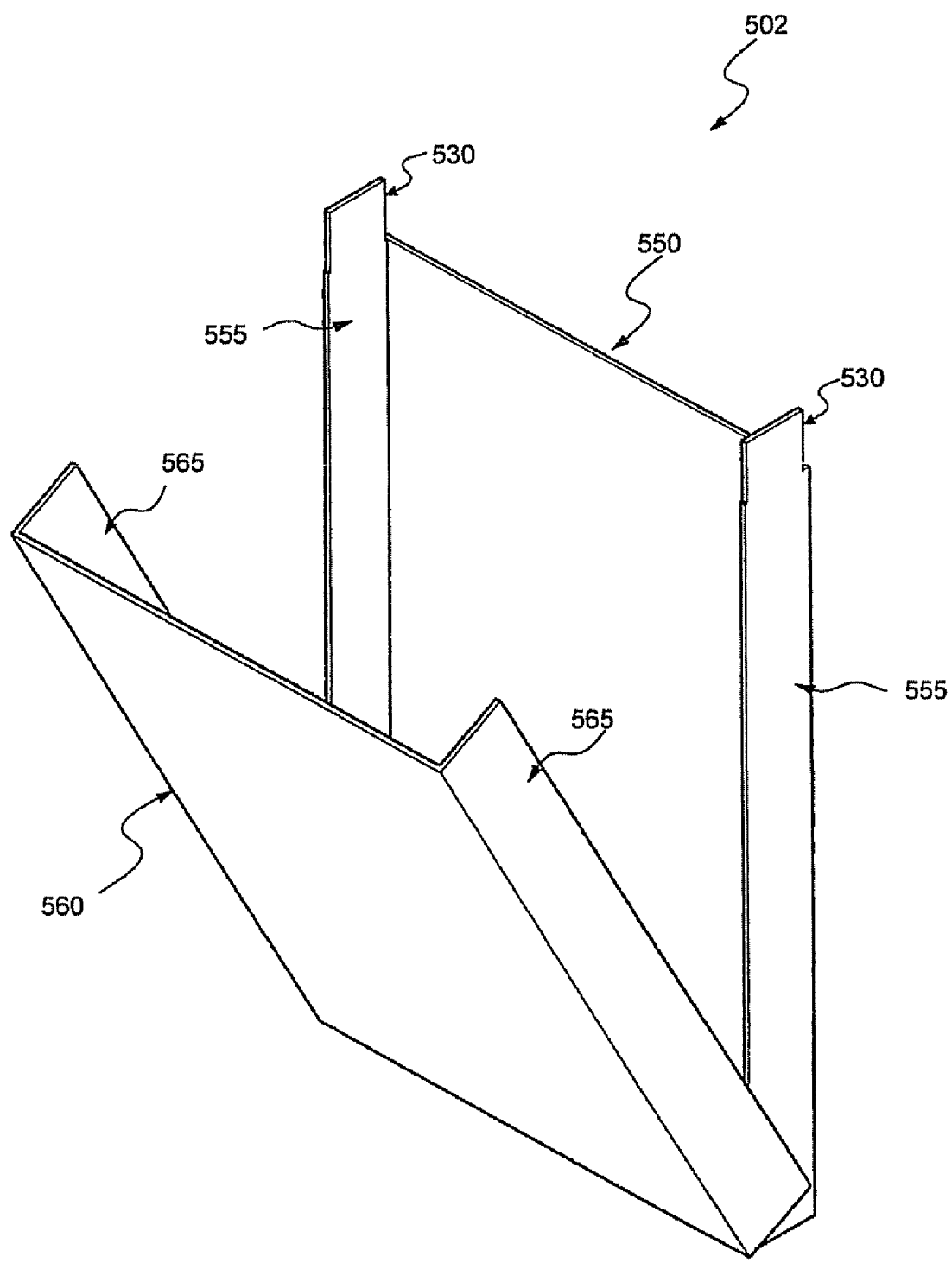
FIG. 3B is an exploded perspective view illustrating the case of a battery pack, according to an exemplary embodiment of the present invention.

FIG. 3A is an exploded perspective view illustrating a case 502 of a battery pack, according to another exemplary embodiment of the present invention, and FIG. 3B is an exploded perspective view illustrating the case 502 before the case 502 is assembled. Referring to FIGS. 3A and 3B, the case 502 includes a first case body 550, including first side walls 555, and a second case body 560, including second side walls 565. The first side walls 555 include tabs 530. The first and second case bodies 550 and 560 are coupled together by overlapping the first and second side walls 555 and 565, at coupling regions B, and folding the tabs 530 over the second side walls 565. The first case body 550 contacts one side of the bare cell 101, and the second case body 560 contacts an opposite side of the bare cell 101.

The case 502 can be made of any material having strength sufficient to reinforce the bare cell 101. For example, the case 502 can be made of a stainless steel, such as a steel use stainless (SUS).

The bare cell 101 (not shown) is inserted between the first case body 550 and the second case body 560 to form the battery pack. The first case body 550 and the second case body 560 contact both longitudinal sides of the bare cell 101, and the first and second side walls 555 and 565 are positioned at the narrow sides of the bare cell 101. The case 502 may be formed as an integrated body. The case 502 may be configured such that the first and second side walls 555 and 565 are positioned at the longitudinal sides of the bare cell 101.

The tabs 530 of the first coupling part 555 are bent toward the second coupling part 565, such that the first case body 550 closely contacts the second case body 560. The length of the tabs 530 can influence the position of the bare cell 101 in the case 502 and the strength of the coupling regions B. Therefore, the length of the tabs 530 generally ranges from about 5% to 10% of the length of the coupling regions B.

According to various embodiments, the second side walls 565 can be positioned inside of the first side walls 555, i.e. closer to the bare cell 101, and the tab 530 can be folded toward the bare cell 101. However, when the tab 530 is bent toward the bare cell 101, the tab 530 may contact and/or damage the bare cell 101, due to swelling that occurs during the discharge and the recharge of the bare cell 101. Thus, as illustrated in FIGS. 3A and 3B, the first side walls 555 are generally positioned nearer to the bare cell 101 than the second side walls 565, and the tab 530 is bent away from the bare cell. Therefore, the tab 530 is prevented from contacting the bare cell.

According to various embodiments, the second coupling part 565 may also optionally have tabs 530 (not shown). However, when both of the first and second side walls 555 and 565 have tabs 530, a thickness of the battery pack may be increased, without significantly improving the coupling of the first and second case bodies 550 and 560.

Figure 4A:
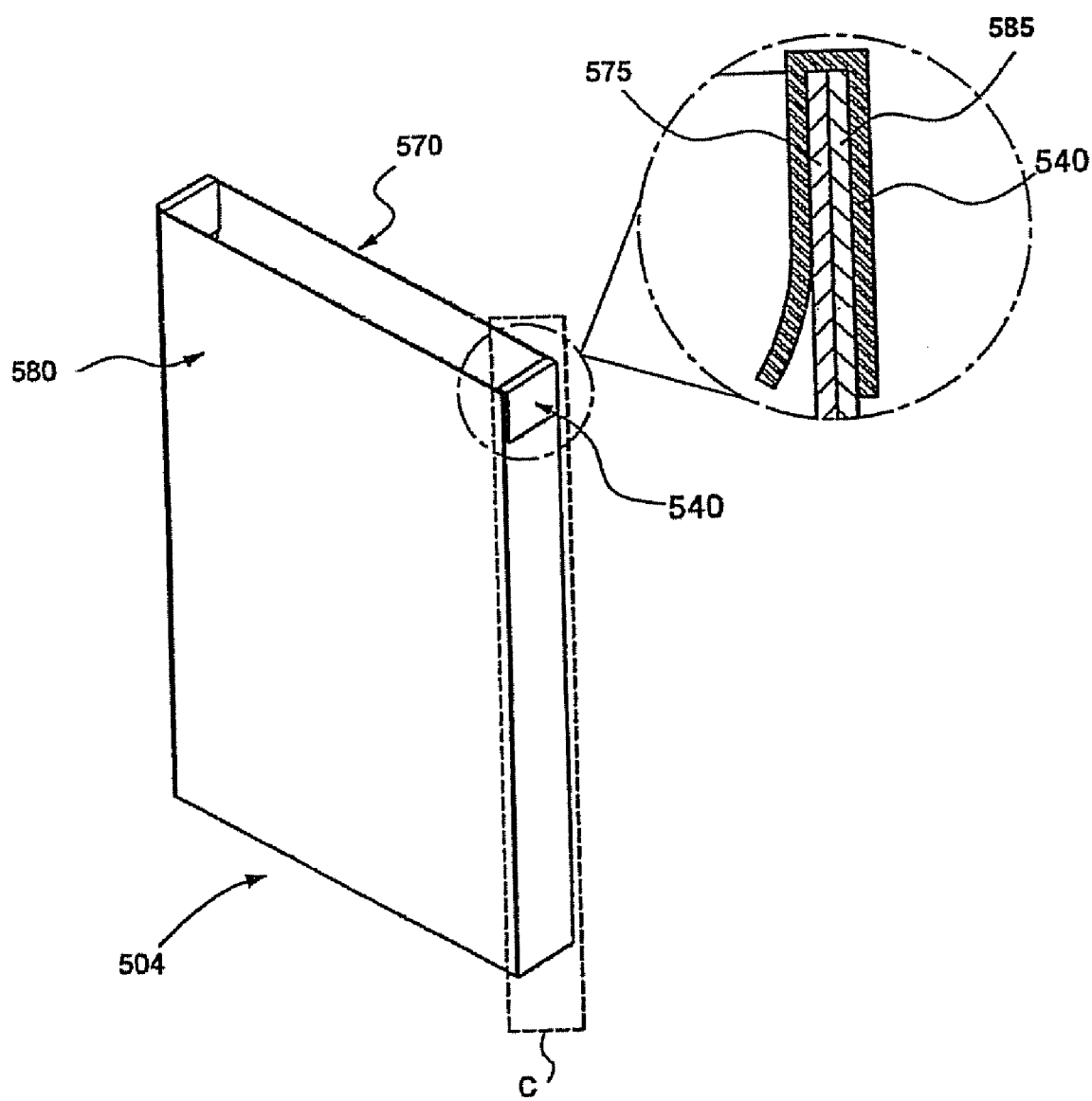
FIG. 4A is a perspective view illustrating a case of a battery pack, according to still another exemplary embodiment of the present invention.
Figure 4B:
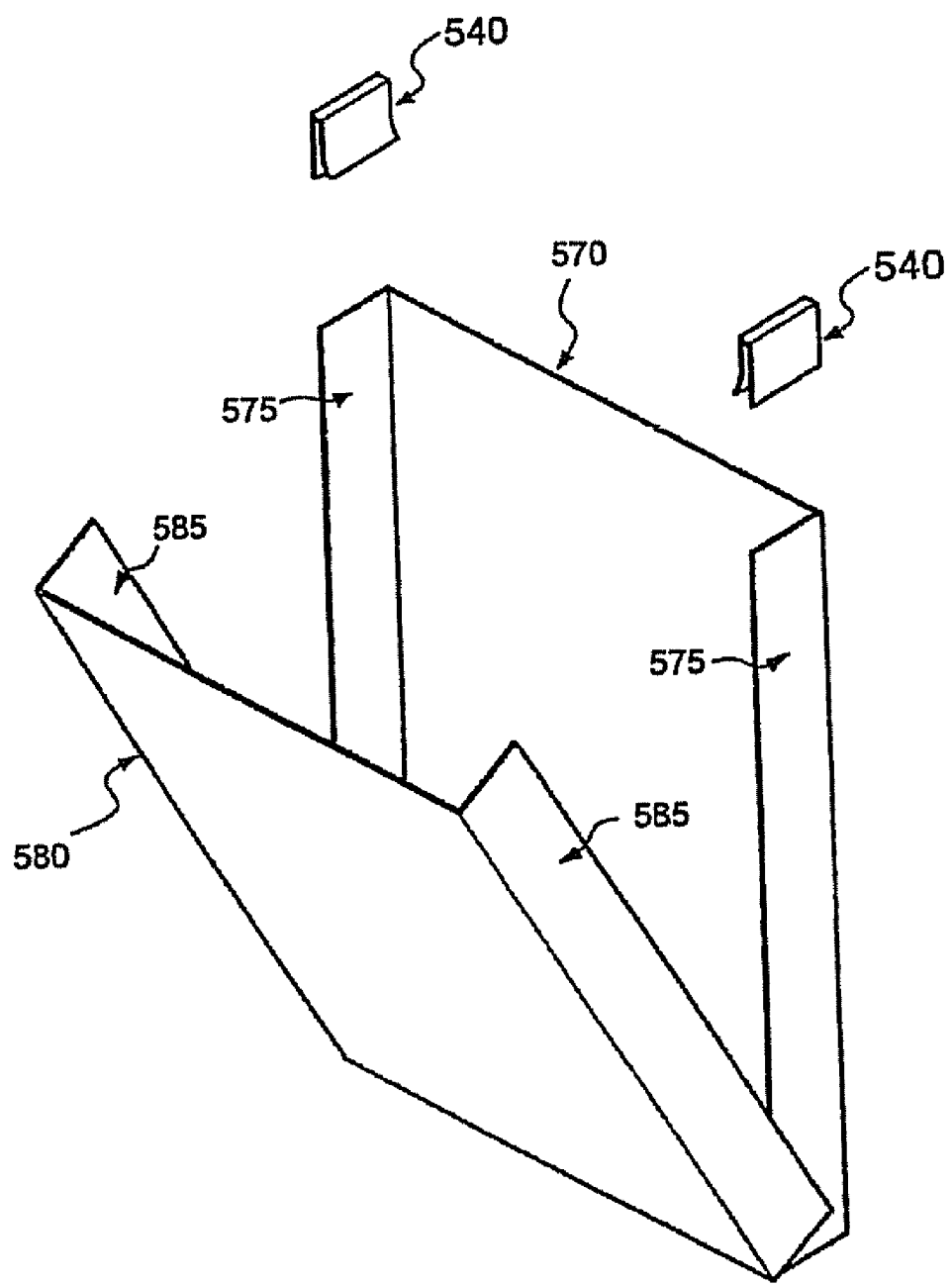
FIG. 4B is an exploded perspective view illustrating a case of a battery pack, according to still another exemplary embodiment of the present invention.

FIG. 4A is a perspective view illustrating a case 504 of a battery pack, according to still another exemplary embodiment of the present invention, and FIG. 4B is an exploded perspective view illustrating the case 504. Referring to FIGS. 4A and 4B, the case 504 includes a first case body 570 including first side walls 575, a second case body 580 including second side walls 585, and clips 540 to couple the first side walls 575 to the second side walls 585 at coupling regions C. The case 504 is similar to the case 502, except that the case 504 lacks the tabs 540. Here, although the case 500 including the first case body 550 and the second case body 560 is made of any material with strength sufficient to reinforce the battery pack, preferably the case 504 is made of a stainless steel, such as a steel use stainless (SUS), for weigh reduction and easy fabrication of the battery pack.

The bare cell 101 (not show) is inserted into the case 504. The first case body 570 and the second case body 580 contact both longitudinal sides of the bare cell 101, and the first and second side walls 575 and 585 are positioned at the narrow sides of the bare cell 101. However, the case 504 may be formed as an integrated body, or may be configured such that the coupling regions C are disposed adjacent to the longitudinal sides of the bare cell 101, such that the first and second side walls 575 and 585 are disposed adjacent to the longitudinal sides of the bare cell 101.

Although not depicted in the drawings, the first and second side walls 575 and 585 of the case 504, may include coupling parts to interlock the first and second side walls 575 and 585, as described with regard to the cases 500 and 502.

The clips 540 may be any device which is positioned at the coupling region C and attaches the first case body 570 to the second case body 580, such that a molding material (such as resin or hot melt), which is introduced into the case 504 during the molding, does not leak out. The clips 540 may also be used with the cases 500 and 502. Additional clips 540 may also be used, such that clips 540 are disposed on both ends of the coupling region C. When described as clips, it is understood that any pressing mechanism can be used combine the sides 575, 585 in addition to or instead of the clips 540.

Therefore, according to aspects of the present invention, the various side walls of the cases include coupling parts, or include tabs, to couple together the various first and second case bodies, so that the molding material, such as, the resin or the hot melt, which is introduced into the case during the molding, is prevented from leaking through the side walls of the cases.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
   a bare cell comprising an electrode assembly, a can to house the electrode assembly, and a cap assembly to seal the can;
   a protecting circuit board electrically connected to the bare cell; and
   a case to enclose the bare cell, the case comprising:
   a first case body to enclose a first portion of the bare cell, the first case body comprising a first main wall and two opposing first side walls, each of the first side walls comprising a first coupling part comprising a first inner surface and a first outer surface facing away from the first inner surface, wherein the first coupling part is curved such that an edge portion of the first outer surface faces another portion of the first outer surface; and
   a second case body to enclose a second portion of the bare cell, the second case body comprising a second main wall and two opposing second side walls, each of the second side walls comprising a second coupling parts comprising a second inner surface and a second outer surface facing away from the second inner surface, the second coupling part is curved such that an edge portion of the second outer surface faces another portion of the second outer surface,
   wherein the first and second coupling parts are configured to elastically deform, and wherein the curved first and the second coupling parts are meshed with each other such that the edge portion of the first outer surface faces the edge portion of the second outer surface.

2. The battery pack according to claim 1, wherein the first and second coupling parts are bent portions of the first and/or second side walls.

3. The battery pack according to claim 2, wherein the bent portions each have a sinusoidal shape including at least one groove and ridge.

4. The battery pack according to claim 1, further comprising a bottom wall attached to edges of the first and second main walls.

5. The battery pack according to claim 1, wherein the first and second side walls form first and second case walls of the case when interlocked, and the first and second coupling parts are disposed along central portions of the first and second case walls.

6. The battery pack according to claim 1, wherein the case is made of a stainless steel.

* * * * *